US006087973A

United States Patent [19]

Rowe et al.

[11] Patent Number: 6,087,973

[45] Date of Patent: Jul. 11, 2000

[54] INCREASED ACCURACY OF RANGE MEASUREMENT BETWEEN DATA LINK SYSTEMS

[75] Inventors: David W. Rowe; Stephen M. Clark, both of Linn County, Iowa

[73] Assignee: Rockwell Science Center, Inc., Thousand Oaks, Calif.

[21] Appl. No.: 08/927,252

[22] Filed: Sep. 11, 1997

[51] Int. Cl.[7] .......... G01S 13/08

[52] U.S. Cl. .......... 342/50; 342/458; 342/42; 342/118

[58] Field of Search .......... 342/458, 42, 47, 342/50, 118; 367/127

[56] References Cited

U.S. PATENT DOCUMENTS 3,875,570 4/1975 Litchford .

*Primary Examiner*—Theodore M. Blum
*Attorney, Agent, or Firm*—Kyle Eppele; James P. O'Shaughnessy

[57] ABSTRACT

A method for increasing the accuracy of ranging measurements between data link systems is described. The method, actively aided ranging, increases ranging measurement accuracy by decreasing the dependence of the measurement on the relative clock bias between data links. The method is immune from error due to time bias between a position interrogator and a responder.

22 Claims, 1 Drawing Sheet

INCREASED ACCURACY OF RANGE MEASUREMENT BETWEEN DATA LINK SYSTEMS

BACKGROUND OF THE INVENTION

The present invention generally relates to the field of navigational systems and more particularly to a method for increasing the accuracy of range measurements between data link systems.

Reducing measurement noise in range measurements is essential to maintaining navigational accuracy of a system that is dependent on ranging to produce or enhance its navigational solution. With current data link systems, ranging accuracy between platforms is highly dependent on the clock bias between the interrogator and the responder, with every nanosecond of clock bias between the systems resulting in approximately one foot of additional ranging error.

Current systems such as the joint tactical information distribution system (JTIDS) attempt to reduce this ranging error by actively synchronizing the clocks between systems. However there is a practical limit to how accurately the systems can be time synched. Any unresolved clock bias in these systems will result in ranging error.

SUMMARY OF THE INVENTION

Accordingly, it is a goal of this invention to provide a method and apparatus for increasing the accuracy of range measurements between data link systems.

The accuracy of the range measurements can be enhanced by using a method referred to herein as actively aided ranging. Actively aided ranging increases the accuracy of the range measurement by decreasing the dependence of the measurement on the relative clock bias between data links.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Figure 1:
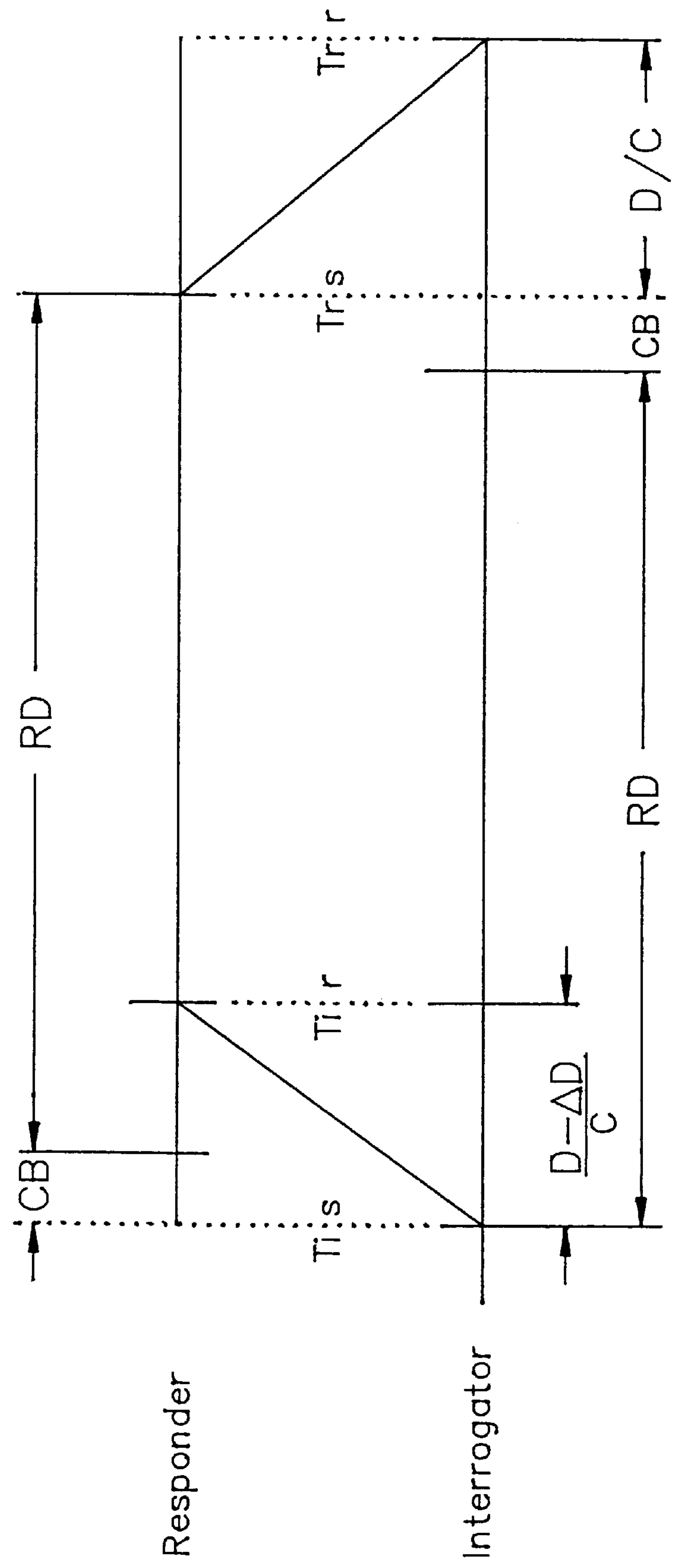
FIG. 1 shows a ranging timing diagram in accordance with the present invention.

Reference will now be made in detail to the presently preferred embodiment of the invention, an example of which is illustrated in the accompanying drawings.

Referring now to FIG. 1, a ranging timing diagram in accordance with the present invention is shown. The position interrogator sends a request for position to the responder. At this time the interrogator also saves its current time and position. Time may be saved implicitly by sending requests only at predefined times.

Upon the responder receiving the request, the responder will save the time of arrival of the requesting message. After a relatively short duration, the responder sends a response message back to the interrogator. The response message contains the following information: the time at which the request was received, the current position of the responder valid at time of response retransmission, the time at which response is being sent which may be sent implicitly by sending responses at predefined times, either current velocity, if the response time was quick relative to the dynamics of the motion of the responder, or the change of responder position from time of position request to position response, and, if needed to support filtering of position updates by the receiver, variance of position, velocity and clock frequency of the responder.

Upon the interrogator receiving the response message, the interrogator stores the time of arrival of the message along with the received message and then calculates the range to the responder at the time the response is received as shown in the following simplified linear equations:

| | |
|---|---|
| 1. $CB = T\|_i - T\|_r$ | (definition) |
| 2. $T_{is}\|_i + (D - \Delta D)/c = T_{ir}\|_r + CB$ | (from diagram) |
| 3. $\Delta T_i = T_{ir}\|_r - T_{is}\|_i$ | (definition) |
| 4. $(D - \Delta D)/c = \Delta T_i + CB$ | (substituting) |
| 5. $T_{rr}\|_i - D/c = T_{rs}\|_r + CB$ | (from diagram) |
| 6. $\Delta T_r = T_{rr}\|_i - T_{rs}\|_r$ | (definition) |
| 7. $D/c = \Delta T_r - CB$ | (substituting) |
| 8. $(2D - \Delta D/c = \Delta T_i + \Delta T_r$ | (add eqs. 4 and 7) |
| 9. $D = [(\Delta T_i + \Delta T_r)c + \Delta D]/2$ | (solving for D) |

where:

D=distance between interrogator and responder at the time of response

ΔD=distance traveled by responder during response time c=speed of light $T_{ir}$=time according to responder that it received interrogation $T_{is}$=time according to interrogator that it sent interrogation $T_{rs}$=time according to responder that it received response CB=clock bias between interrogator and responder The variance of the range measurement comprises:

$$\sigma^2_{\Delta Ti}=\sigma^2_{rm}+(\sigma^2_{rf}+\sigma^2_{if})\times RD^2$$

$$\sigma^2_{\Delta D}=(\sigma^2_{rv}+\sigma^2_{iv})\times RD^2$$

$$\sigma^2_{\Delta Tr}=\sigma^2_{im}$$

$$\sigma^2_{D}=[(\sigma^2_{\Delta Ti}+\sigma^2_{\Delta Tr})\times c^2+\sigma^2_{\Delta D}]/2$$

where:

$\sigma^2_{xm}$=variance of terminal measurement (x is either i or r as defined below)

$\sigma^2_{xv}$=variance of velocity (x is either i or r as defined below)

$\sigma^2_{xf}$=variance of frequency (x is either i or r as defined below)

$\sigma^2_{\Delta Ti}$=variance of $\Delta T_i$ at time $T_{rs}$ $\sigma^2_{\Delta D}$=variance of ΔD at time $T_{rr}$ $\sigma^2_{\Delta Tr}$=variance of $\Delta T_r$ at time $T_{rr}$ $\sigma^2_{D}$=variance of D at time $T_{rr}$ c=speed of light RD=delay of response to of the responder; wherein i corresponds to the interrogator and r corresponds to the responder.

It is apparent from the above algorithm that there is no error introduced into the ranging method according to the present invention due to time bias between the interrogator and the responder.

It is believed that the method for increased accuracy of range measurement between data link systems of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for ranging having an increased accuracy, comprising:

sending a position request message from an interrogator to a responder wherein the interrogator stores present time and position;

receiving the position request message at the responder from the interrogator wherein the responder stores the time of arrival of the requesting message at the responder;

at an arbitrary time after said receiving step, sending a response message from the responder to the interrogator in response to the responder receiving the position request message;

receiving the response message at the interrogator from the responder wherein the interrogator stores the response message and the time of arrival of the response message; and calculating the range from the interrogator to the responder at the time the response message is received at the interrogator.

2. A method according to claim 1, wherein the position request message is sent at a predetermined time.

3. A method according to claim 1, wherein the response message includes the time at which the position request message was received at the responder.

4. A method according to claim 1, wherein the response message includes the position of the responder at the time the response message is sent.

5. A method according to claim 1, wherein the response message includes the time at which the response message is sent.

6. A method according to claim 1, wherein the response message is sent at a predetermined time.

7. A method according to claim 1, wherein the response message includes the present velocity of the responder.

8. A method according to claim 1, wherein the response message includes the change in position of the responder from the time at which the responder received the position request message to the time at which the response message is sent.

9. A method according to claim 1, wherein the response message includes the variance of position of the responder.

10. A method according to claim 1, wherein the response message includes the variance of velocity of the responder.

11. A method according to claim 1, wherein the response message includes the variance of clock frequency of the responder.

12. A method for ranging having an increased accuracy, comprising:

sending a position request message from an interrogator to a responder wherein the interrogator stores present time and position;

receiving the position request message at the responder from the interrogator wherein the responder stores the time of arrival of the requesting message at the responder;

at an arbitrary time after said receiving step, sending a response message from the responder to the interrogator in response to the responder receiving the position request message;

receiving the response message at the interrogator from the responder wherein the interrogator stores the response message and the time of arrival of the response message; and calculating the range to the interrogator from the responder at the time the response message is received at the interrogator.

13. A method according to claim 12, wherein the position request message is sent at a predetermined time.

14. A method according to claim 12, wherein the response message includes the time at which the position request message was received at the responder.

15. A method according to claim 12, wherein the response message includes the position of the responder at the time the response message is sent.

16. A method according to claim 12, wherein the response message includes the time at which the response message is sent.

17. A method according to claim 12, wherein the response message is sent at a predetermined time.

18. A method according to claim 12, wherein the response message includes the present velocity of the responder.

19. A method according to claim 12, wherein the response message includes the change in position of the responder from the time at which the responder received the position request message to the time at which the response message is sent.

20. A method according to claim 12, wherein the response message includes the variance of position of the responder.

21. A method according to claim 12, wherein the response message includes the variance of velocity of the responder.

22. A method according to claim 1, wherein the response message includes the variance of clock frequency of the responder.

* * * * *